(12) United States Patent
Jiang et al.

(10) Patent No.: US 11,125,068 B2
(45) Date of Patent: Sep. 21, 2021

(54) CHANNEL FRACTURING METHOD WITH ALTERNATIVE INJECTION OF CONVENTIONAL AND CAPSULE-TYPE SOLUBLE PROPPANTS

(71) Applicant: SOUTHWEST PETROLEUM UNIVERSITY, Chengdu (CN)

(72) Inventors: Youshi Jiang, Chengdu (CN); Yan Kou, Chengdu (CN); Yongming Li, Chengdu (CN); Zhibin He, Chengdu (CN); Jing Jia, Chengdu (CN); Wang Tang, Chengdu (CN); Ang Luo, Chengdu (CN); Bo Chen, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 0 days.

(21) Appl. No.: 17/226,078

(22) Filed: Apr. 9, 2021

(65) Prior Publication Data

US 2021/0222537 A1 Jul. 22, 2021

(30) Foreign Application Priority Data

Apr. 10, 2020 (CN) .......................... 202010279702.3

(51) Int. Cl.
*E21B 43/267* (2006.01)
*C09K 8/80* (2006.01)

(52) U.S. Cl.
CPC ............ *E21B 43/267* (2013.01); *C09K 8/805* (2013.01)

(58) Field of Classification Search
CPC ...................................................... E21B 43/26
See application file for complete search history.

(56) References Cited

U.S. PATENT DOCUMENTS

| | | | | | |
|---|---|---|---|---|---|
| 3,850,247 A | * | 11/1974 | Tinsley | ................. | E21B 43/267 166/280.1 |
| 3,933,205 A | * | 1/1976 | Kiel | ....................... | E21B 43/26 166/308.1 |

(Continued)

FOREIGN PATENT DOCUMENTS

| | | |
|---|---|---|
| CN | 102695847 A | 9/2012 |
| CN | 104453829 A | 3/2015 |

(Continued)

*Primary Examiner* — Angela M DiTrani Leff
*Assistant Examiner* — Avi T Skaist

(57) ABSTRACT

The present invention relates to a channel fracturing method with alternative injection of conventional and capsule-type soluble proppants. The method includes the following steps: injecting pad fluid into a wellbore to break a formation and form fractures in the formation; alternately injecting a sand-carrying fluid containing conventional proppant and a sand-carrying fluid containing capsule-type soluble proppant into the wellbore in sequence to support fractures in the formation and continue to fracture the formation; injecting displacement fluid into the wellbore to completely displace the sand-carrying fluids in the wellbore into the fractures. The conventional proppant of less dosage is used. The capsule-type soluble proppant is less difficult to be developed and its solubility is sensitive to the fracture closure, which is conducive to the quick flowback after fracturing. The channel fracturing technology is more mature, reliable, and cost-effective, and the concept of forming high-conductivity channel is more simple and effective.

4 Claims, 2 Drawing Sheets

(56) References Cited

U.S. PATENT DOCUMENTS 4,078,609 A * 3/1978 Pavlich ................ E21B 33/138
166/271
2018/0237688 A1* 8/2018 Duenckel ................ E21B 47/11

FOREIGN PATENT DOCUMENTS

| CN | 104727799 A | 6/2015 |
| CN | 205135590 U | 4/2016 |

* cited by examiner

CHANNEL FRACTURING METHOD WITH ALTERNATIVE INJECTION OF CONVENTIONAL AND CAPSULE-TYPE SOLUBLE PROPPANTS

BACKGROUND OF THE INVENTION

Field of the Invention

The present invention relates to a channel fracturing method with alternative injection of conventional and capsule-type soluble proppants, belonging to the technical field of hydraulic fracture stimulation of low-permeability unconventional oil and gas reservoirs.

Description of Related Art

Channel fracturing is a new theory to significantly improve the flow conductivity of hydraulic fractures, of which the core principle is to change the continuously distributed proppant sand piles in hydraulic fractures into countless discontinuous sand piles separated by channel fractures (no proppant) through some technological means. Since the channel fractures are not occupied by proppant, the resistance to oil and gas flow in the channel is much lower than that in proppant packing formation, the flow conductivity of hydraulic fractures after channel fracturing is 1 to 2 orders of magnitude higher than that of conventional propped fractures. Based on the theory of channel fracturing, scholars proposed many specific technological methods.

Chinese patent CN107387053A proposed a channel fracturing technology that integrates multi-cluster perforation, pulsed injection of proppant slug, and tail-in proppant and other technologies. The discontinuous proppant distribution is achieved by injecting sand-carrying fluid with fiber and proppant and base fluid without fiber and proppant alternately into the formation by means of pulsed injection of proppant slug. The distribution of channel fractures is affected by adjusting parameters such as fiber concentration, pulse fiber adding time, and alternating frequency. However, the experimental results indicated that it was difficult to maintain the discontinuous distribution of proppant in the flowing process of sand-carrying fluid after the proppant cluster settled and formed sand piles.

Chinese patent CN108203581A proposed a method for realizing high-conductivity channel with self-aggregating proppant and degradable proppant. In this method, two proppants were injected into the well separately by pulse or mixed and injected into the well. The degradation rate of degradable proppant has nothing to do with whether the fracture is closed or not. If the degradation of the degradable proppant is too fast before the fracture is closed, it is difficult to maintain the high-conductivity channel; if the dissolution of the degradable proppant is too slow, it will take a long period time to form a high-conductivity channel, affecting the flowback of fracturing fluid and the production of oil and gas.

Chinese patent CN109372489A proposed a method for realizing high-conductivity channel with self-aggregating proppant. Polymer was added to fracturing fluid containing conventional proppant, enabling the proppant to aggregate and become a self-aggregating proppant, thereby generating channel fracture. The self-aggregating proppant can form proppant clusters automatically which are not easily dispersed in the process of flowback and production after fracturing, and can also capture the reservoir particles in the production fluid, so as to realize the self-cleaning function of oil and gas flow channel. However, the patent did not provide the distribution of self-aggregating proppant under the action of polymer and the control method of self-aggregating, so the effectiveness of the field application of the technology needs to be further determined.

Chinese patent CN109025947A proposed an indoor channel fracturing experiment device and method based on heterogeneous soft magnetic proppant. In the method, magnetic particles used were 20 to 70 meshes in size range and 0.5 to 0.9 in a sphericity range, and the distribution of heterogeneous soft magnetic proppant in fracture model was controlled by adjustment of magnetic field intensity around the visual fracture model, so as to distribute sand unevenly and form channel fractures. Special magnetic particles and underground magnetic field control device, required for this channel fracturing technology, make it costly to apply this technology on a large scale on site.

SUMMARY OF THE INVENTION

The present invention mainly aims to solve the deficiencies in the prior art and provides a channel fracturing method with alternative injection of conventional and capsule-type soluble proppants, which is advantaged by high reliability and low cost.

The technical solution adopted in the present invention to solve the above technical problems is: a channel fracturing method with alternative injection of conventional and capsule-type soluble proppants, including the following steps:

Step S10: Injecting a pad fluid into a wellbore to break a formation and form fractures in the formation.

Step S20: Alternately injecting a sand-carrying fluid containing a capsule-type soluble proppant and a sand-carrying fluid containing a conventional proppant into the wellbore in sequence to support the fractures in the formation and continue to fracture the formation.

The capsule-type soluble proppant includes capsule-type coated particles, and each of the capsule-type coated particles consists of a soluble core and an outer coating that wraps the soluble core.

Step S30: Injecting a displacement fluid into the wellbore to completely displace the sand-carrying fluids in the wellbore into the fractures.

Step S40: Shutting in the wellbore after fracturing, waiting for a net closing pressure in the fractures (a fracture closing pressure minus a downhole fluid pressure) to exceed a compressive strength of the capsule-type soluble proppant, and then opening the wellbore to discharge the fluids.

After the fracturing is completed, the hydraulic fractures are closed under the action of crustal pressure. When the net closing pressure exceeds the compressive strength of the capsule-type soluble proppant, the outer coating of the capsule breaks, and the soluble core directly contacts the fracturing fluid and gradually dissolves to form a high-conductivity channel. The conventional proppant sand layer remains stable under the action of the closing pressure, and finally forms a proppant paving pattern in which the high-conductivity channel and the conventional proppant sand layer overlap each other vertically in the fractures produced by fracturing, thereby significantly improving an overall flow conductivity of the fractures.

A further technical solution is that the soluble core consists of inorganic salt and binder, and a mass ratio of which is 98:2.

A further technical solution is that the inorganic salt is one or more of $CaCl_2$), $NH_4Cl$, $NaBr$, and $NaNO_3$.

A further technical solution is that the binder is an organic binder.

A further technical solution is that the organic binder is made of starch or latex.

A further technical solution is that the outer coating is a degradable resin which has a certain strength and not easy to break before the fractures are closed, and can effectively isolate the fracturing fluid from its soluble core, ensuring that stable sand piles are formed by the capsule-type soluble proppant and the conventional proppant before the fractures are closed. After the fractures are closed, when the net closing pressure exceeds the compressive strength of the outer coating (that is, the compressive strength of the capsule-type soluble proppant), the coating breaks and can no longer isolate the fracturing fluid from its soluble core, and the soluble core of the capsule-type soluble proppant gradually dissolves after contacting with the fracturing fluid. The net closing pressure is the difference between the fracture closing pressure and the fluid pressure in the fractures. During the shut-in period after fracturing, the fluids in the fracture hardly flow, and the fluid pressure in the fractures can be regarded as equal to the downhole pressure.

A further technical solution is that the method of alternately injecting two sand-carrying fluids in Step S20 is to inject a next section of the sand-carrying fluid immediately after fully injecting into a previous section of the sand-carrying fluid, without waiting for the solid particles in the previous section of the sand-carrying fluid to settle completely, and finally inject the sand-carrying fluid containing conventional proppant. A sand ratio of the section of the conventional proppant fluid to the section of the capsule-type soluble proppant fluid is 1:1 to 3:1.

The present invention has the following advantages: with the method for realizing high-conductivity channel by alternative injection of conventional proppant and capsule-type soluble proppant, the capsule-type soluble proppant is featured by extremely low dissolution rate before fractures are closed and high dissolution rate after fractures are closed. In the process of hydraulic fracturing, insoluble conventional proppant and capsule-type soluble proppant are alternately added, and two kinds of solid particles stack together to form sand piles in the process of migration and settlement. After the fracturing is completed, the hydraulic fractures are closed under the action of crustal pressure, and the closed fractures fix the proppant sand pile as a whole. When the net closure pressure exceeds the pressure that the outer coating of the capsule of the capsule-type soluble proppant can withstand, the outer coating of the capsule breaks and its soluble core dissolves after a direct contact with the fracturing fluid, thus forming a high-conductivity channel for the flow of oil and gas in the proppant sand pile. The channel fracturing can be conducted with existing sand fracturing equipment and conventional proppant of less dosage, and there is less difficulty in the development of capsule-type soluble proppant, so the channel fracturing technology is more mature, reliable, and cost-effective, and the concept of forming high-conductivity channel is more simple and effective.

BRIEF DESCRIPTION OF THE DRAWINGS

Aspects of the present invention are best understood from the following detailed description when read with the accompanying figures. The exemplary embodiments of the present invention and the description thereof are used to explain the present invention, and do not constitute improper limitations on the preset invention. In the drawings.

DESCRIPTION OF THE INVENTION

The technical solutions of the present invention are further described in detail with embodiments and drawings.

Embodiment 1

A channel fracturing method with alternative injection of conventional and capsule-type soluble proppants, including the following steps:

Step 1: In a pad fluid stage of hydraulic fracturing, continuously injecting a pad fluid into a formation to break the formation and form hydraulic fractures.

Step 2: In a sand-carrying fluid stage of hydraulic fracturing, first injecting a sand-carrying fluid containing a capsule-type soluble proppant into the formation, injecting a sand-carrying fluid containing a conventional proppant after the sand-carrying fluid containing the capsule-type soluble proppant completely settles, and then repeatedly injecting the two sand-carrying fluids respectively containing the capsule-type soluble proppant and the conventional proppant alternately after the sand-carrying fluid containing the conventional proppant completely settles; and finally, after the sand-carrying fluid containing the conventional proppant is all injected, the proppant distribution is shaped as layered piles.

Figure 1:
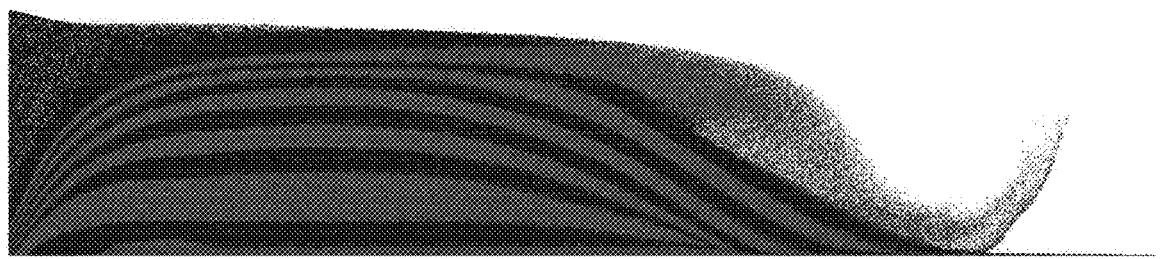
FIG. 1 is a distribution diagram of layered sand piles formed by alternative injection of a conventional proppant and a capsule-type soluble proppant before fractures are closed.

Its distribution pattern is as shown in FIG. 1. The black dots in FIG. 1 represent the conventional proppant, and the gray dots represent the capsule-type soluble proppant. When the fractures are closed, the sand layer formed by the accumulation of the conventional proppant (black dots) remains unchanged, while the sand layer formed by the accumulation of capsule-type soluble proppant (gray dots) forms a high-conductivity channel due to dissolution after contacting with fracturing fluid.

Step 3: In a displacement fluid stage, injecting a displacement fluid into the formation to completely displace the sand-carrying fluid containing conventional proppant in the last section into the fractures.

Step 4: Shutting in the wellbore after fracturing, waiting for a net closing pressure in the fractures (a fracture closing pressure minus a downhole fluid pressure) to exceed a compressive strength of the capsule-type soluble proppant, and then opening the wellbore to discharge the fluids.

Step 5: After the hydraulic fractures is closed, an outer coating of the capsule-type soluble proppant breaks and a soluble core is dissolved under the action of the closing pressure, thereby forming a high-conductivity channel, the conventional proppant sand layer remains stable under the action of the closing pressure, and finally forms a proppant paving pattern in which the high-conductivity channel and the conventional proppant sand layer overlap each other vertically in the fractures produced by fracturing, thereby significantly improving an overall flow conductivity of the fractures. The flowback rate of fracturing fluid and the production rate of oil and gas can be monitored in the process of wellbore opening and fluid discharging.

In this embodiment, the pumping of the pad fluid, the sand-carrying fluids and the displacement fluid for channel fracturing is as shown in Table 1.

TABLE 1

| Stage | Net fluid volume (m³) | Sand ratio (%) | Sand volume (m³) | Sand-fluid volume (m³) | Displacement (m³/min) | Stage duration (min) | Remarks |
|---|---|---|---|---|---|---|---|
| Pad fluid | 200 | | | 200 | 3 | 66.7 | Base fluid |
| Sand-carrying fluid | 30 | 7 | 2.1 | 32.1 | 3 | 10.7 | Conventional proppant |
| Sand-carrying fluid | 30 | 10 | 3 | 33 | 3 | 11.0 | Capsule-type soluble proppant |
| Sand-carrying fluid | 30 | 13 | 3.9 | 33.9 | 3 | 11.3 | Conventional proppant |
| Sand-carrying fluid | 30 | 16 | 4.8 | 34.8 | 3 | 11.6 | Capsule-type soluble proppant |
| Sand-carrying fluid | 30 | 19 | 5.7 | 35.7 | 3 | 11.9 | Conventional proppant |
| Sand-carrying fluid | 30 | 22 | 6.6 | 36.6 | 3 | 12.2 | Capsule-type soluble proppant |
| Sand-carrying fluid | 30 | 22 | 6.6 | 36.6 | 3 | 12.2 | Conventional proppant |
| Sand-carrying fluid | 30 | 22 | 6.6 | 36.6 | 3 | 12.2 | Capsule-type soluble proppant |
| Sand-carrying fluid | 30 | 22 | 6.6 | 36.6 | 3 | 12.2 | Conventional proppant |
| Sand-carrying fluid | 30 | 22 | 6.6 | 36.6 | 3 | 12.2 | Capsule-type soluble proppant |
| Sand-carrying fluid | 5 | 25 | 1.25 | 6.25 | 3 | 2.1 | Conventional proppant |
| Displacement fluid | 27 | | | 30 | 3 | 10.0 | Base fluid |
| Total | 532 | | | 588.8 | | 196.3 | |

Comparative Example 1

The same fracturing method was used for fracturing in the same formation as Embodiment 1, and finally the flowback rate of fracturing fluid and the production rate of oil were monitored. The only difference was that only sand-carrying fluid containing conventional proppant was injected.

Figure 2:
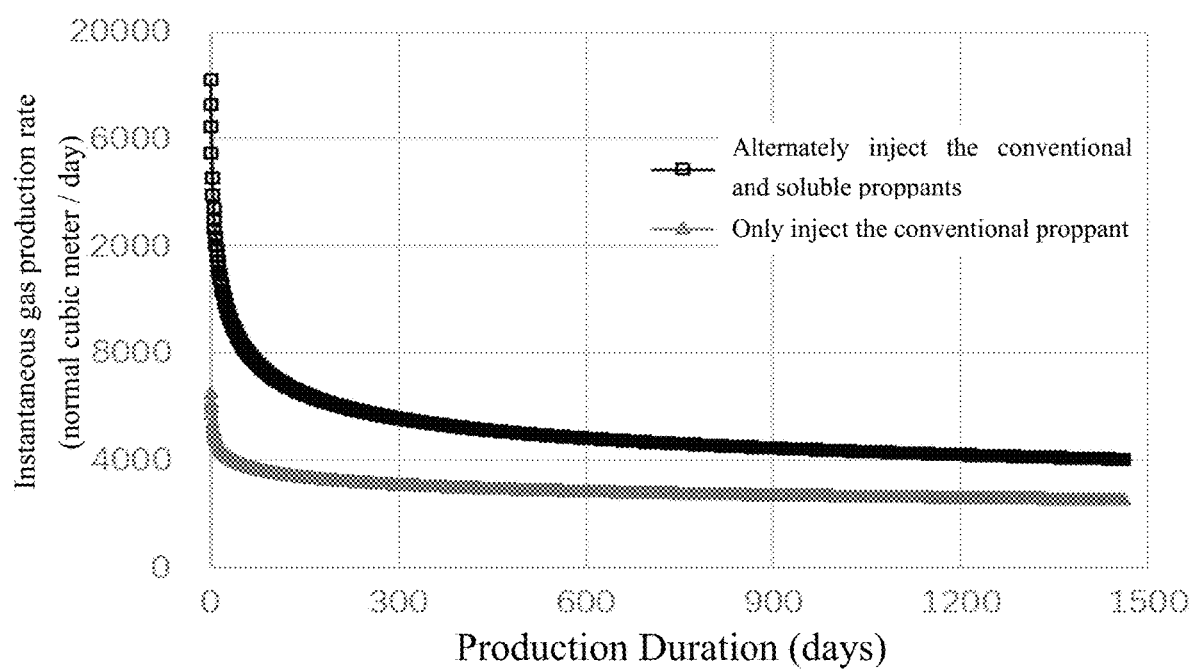
FIG. 2 is a comparison chart of gas production rate of two fracturing technologies.

The comparison of gas production rate between Embodiment 1 and Comparative Example 1 is as shown in FIG. 2.

The capsule-type soluble proppant mentioned in the present invention is a kind of coated particle composed of a soluble core and an outer coating, and its structural stability is sensitive to a closing pressure, so it is quite different from other soluble or degradable particles. The main component of the soluble core is water-soluble inorganic salt, and the outer coating is made of a degradable resin material. The outer coating is characterized by a certain strength, not easy to break before the fractures are closed, and can effectively isolate the fracturing fluid from its soluble core, ensuring that stable sand piles are formed by the capsule-type soluble proppant and conventional proppant before the fractures are closed. After the fractures are closed, when the net closing pressure (the difference between the closing pressure and the fluid pressure in the fracture) exceeds the compressive strength of the outer coating, the coating breaks and can no longer isolate the fracturing fluid from its soluble core, and the soluble core of the capsule-type soluble proppant gradually dissolves after contacting with the fracturing fluid, thereby forming a high-conductivity channel without proppant support.

Since the structural stability of the capsule-type soluble proppant is sensitive to the closing pressure, and the fractures will be closed within a short time at the end of the hydraulic fracturing, the closing pressure can also act on the capsule-type soluble proppant in a very short period of time. Therefore, a high-conductivity channel can be formed quickly after the hydraulic fracturing, thereby rapidly improving the comprehensive conductivity of hydraulic fractures in a short period of time, and accelerating the flowback of fracturing fluid and the production of oil and gas.

After the capsule-type soluble proppant and the conventional proppant are injected alternately, two kinds of solid particles are mutually stacked to form layered sand piles. After the capsule-type soluble proppant is dissolved, a "long and continuous strip" high-conductivity channel can be formed in the hydraulic fractures. The channel can reach the depth of the fractures from the near well, which ensures the long-distance connectivity of the high-conductivity channel and prevents the high-conductivity channel from being blocked by conventional proppant sand, thereby effectively achieving the "deep penetration and high conductivity" of the high-conductivity channel.

The above are not intended to limit the present invention in any form. Although the present invention has been disclosed as above with embodiments, it is not intended to limit the present invention. Those skilled in the art, within the scope of the technical solution of the present invention, can use the disclosed technical content to make a few changes or modify the equivalent embodiment with equivalent changes. Within the scope of the technical solution of the present invention, any simple modification, equivalent change and modification made to the above embodiments according to the technical essence of the present invention are still regarded as a part of the technical solution of the present invention.

What is claimed is:

1. A channel fracturing method with alternative injection of proppant and coated particles, comprising the following steps:
    injecting a pad fluid into a wellbore to break a formation and form fractures in the formation;
    alternately injecting a sand-carrying fluid containing coated particles and a sand-carrying fluid containing proppant into the wellbore in sequence to support the fractures in the formation and continue to fracture the formation;
    wherein the coated particles consists of a soluble core and an outer coating that wraps the soluble core, and further wherein the soluble core consists of an inorganic salt and a binder at a mass ratio of 98:2, and wherein the outer coating is a degradable resin;
    wherein alternately injecting the two sand-carrying fluids comprises injecting into the wellbore a next section of the sand-carrying fluid containing the coated particles immediately after fully injecting into the wellbore a previous section of the sand-carrying fluid containing the coated particles, without waiting for the particles in the previous section of the sand-carrying fluid containing the coated particles to settle completely, and finally injecting the sand-carrying fluid containing the proppant, and further wherein a sand ratio of the section of the sand-carrying fluid containing the proppant to the section of the sand-carrying fluid containing the coated particles is 1:1 to 3:1;
    injecting a displacement fluid into the wellbore to completely displace the two sand-carrying fluids in the wellbore into the fractures; and
    shutting in the wellbore after fracturing, waiting for a net closing pressure in the fractures to exceed a compressive strength of the coated particles, and then opening the wellbore to discharge the fluids.

2. The channel fracturing method with alternative injection of proppant and coated particles according to claim 1, wherein the inorganic salt is one or more of CaCl2, NH4Cl, NaBr, and NaNO3.

3. The channel fracturing method with alternative injection of proppant and coated particles according to claim 2, wherein the binder is an organic binder.

4. The channel fracturing method with alternative injection of proppant and coated particles according to claim 3, wherein the organic binder is made of starch or latex.

* * * * *